US008519335B2

(12) United States Patent
Fischbach et al.

(10) Patent No.: US 8,519,335 B2
(45) Date of Patent: Aug. 27, 2013

(54) DETECTION OF SOLAR EVENTS (75) Inventors: Ephraim Fischbach, West Lafayette, IN (US); Jere Jenkins, Lafayette, IN (US)

(73) Assignee: Purdue Research Foundation, West Lafayette, IN (US)

( * ) Notice: Subject to any disclaimer, the term of this patent is extended or adjusted under 35 U.S.C. 154(b) by 673 days.

(21) Appl. No.: 12/235,393

(22) Filed: Sep. 22, 2008

(65) Prior Publication Data
US 2009/0090869 A1   Apr. 9, 2009

Related U.S. Application Data (60) Provisional application No. 60/974,275, filed on Sep. 21, 2007.

(51) Int. Cl.
 G01T 1/00 (2006.01)
 G01T 1/178 (2006.01)
 G08B 17/12 (2006.01)
 G01J 5/00 (2006.01)

(52) U.S. Cl.
 USPC ............. 250/336.1; 250/370.02; 250/526; 340/600

(58) Field of Classification Search
 USPC ............. 250/336.1, 370.02, 526; 340/600
 See application file for complete search history.

(56) References Cited

U.S. PATENT DOCUMENTS

| | | | |
|---|---|---|---|
| 3,714,431 A * | 1/1973 | Sterk | ............................ 250/367 |
| 5,521,813 A | 5/1996 | Fox et al. | |
| 6,581,008 B2 | 6/2003 | Intriligator et al. | |
| 7,096,121 B2 | 8/2006 | Intriligator et al. | |
| 7,181,346 B1 | 2/2007 | Kleist et al. | |
| 2007/0057194 A1* | 3/2007 | Ryan et al. | ............... 250/390.11 |

OTHER PUBLICATIONS

Norman et al., "Evidence against correlations between nuclear decay rates and Earth-Sun distance," Astroparticle Physics, vol. 31 (2009) pp. 135-137.*
Falkenberg, E.D., "Radioactive Decay Caused by Neutrinos?" Apr. 2001, http://redshift.vif.com/JournalFiles/V08N02PDFN08N2FAL.pdf, Apeiron, vol. 8, No. 2, pp. 32-45.
Kalinin, E.V., Stozhkov, Yu.I. "The Variations in Counting Rates of Cl—Ar and Ga—Ge Solar Neutrino Detectors" (3 pages), 2007.
Knoll, G.F., "Radiation Detection Measurement" 1989, Wiley & Sons, New York, vol. 2, lines 10-18, p. 2.
Jenkins, J.H., Fischbach, E., "Perturbation of Nuclear Decay Rates During the Solar Flare of Dec. 13, 2006" Physics Department, Purdue University, West Lafayette, IN, USA, http://arxiv.org/ftp/arxiv/papers/0808/0808.3156.pdf, pp. 1-13, Aug. 22, 2008.

(Continued)

Primary Examiner — David Porta
Assistant Examiner — Mindy Vu
(74) Attorney, Agent, or Firm — Proskauer Rose LLP (57) ABSTRACT A flux detection apparatus can include a radioactive sample having a decay rate capable of changing in response to interaction with a first particle or a field, and a detector associated with the radioactive sample. The detector is responsive to a second particle or radiation formed by decay of the radioactive sample. The rate of decay of the radioactive sample can be correlated to flux of the first particle or the field. Detection of the first particle or the field can provide an early warning for an impending solar event.

28 Claims, 10 Drawing Sheets (56) References Cited

OTHER PUBLICATIONS

Lanzerotti, L.J., Raghavan, R.S., "Solar Activity and Solar Neutrino Flux" Sep. 10, 1981, Bell Laboratories, Murray Hill, NJ, USA, Nature ,vol. 293, pp. 122-124.

Norman, E.B., "Evidence Against Correlations Between Nuclear Decay Rates and Earth-Sun Distance" Mar. 1, 2009, Astroparticle Physics, North-Holland, vol. 31, No. 2, pp. 135-137.

Semkow, T.M., "Oscillations in Radioactive Exponential Decay" May 25, 2009, Physics Letters, Section B, North-Holland, Amsterdam, NL, vol. 675, No. 5, pp. 415-419.

Wagenseil, P. "Solar Storm May Ground Aircraft, Overload Power Grids" Dec. 15, 2006, http://foxnews.com/printer_friendly_story/0,3566,236520,00.html p. 1-2.

International Search Report for International Application No. PCT/US2008/077227 (3 pages).

J.H. Jenkins and E. Fischbach, "Perturbation of Nuclear Decay Rates During the Solar Flare of Dec. 13, 2006," Astroparticle Physics, vol. 31 (2009) pp. 407-411.

J.H. Jenkins, E. Fischbach, et al., "Evidence of Correlations Between Nuclear Decay Rates and Earth-Sun Distance," Astroparticle Physics, vol. 32 (2009) pp. 42-46.

E. Fischbach, J. B. Buncher, J.T. Gruenwald, J.H. Jenkins, D.E. Krause, J.J. Mattes, and J.R. Newport, "Time-Dependent Nuclear Decay Parameters: New Evidence for New Forces?," Space Science Reviews, vol. 145 (2009) pp. 285-335.

J.H. Jenkins, D.W. Mundy, and E. Fischbach, "Analysis of Environmental Influences in Nuclear Half-Life Measurements Exhibiting Time-Dependent Decay Rates," Nuclear Instruments and Methods in Physics Research A, vol. 620 (2010) pp. 332-342.

http://throughthewormhole.net/season-2/episode-6-how-does-the-universe-work/.

\* cited by examiner

DETECTION OF SOLAR EVENTS

CROSS-REFERENCE TO RELATED APPLICATION

This application claims priority to and the benefit of U.S. provisional patent application No. 60/974,275 filed in the United States Patent Office on Sep. 21, 2007, the entire disclosure of which is herein incorporated by reference.

GOVERNMENT RIGHTS

The government may have certain rights in portions of the invention made with government support under Contract DE-AC02-76ERO142 awarded by the Department of Energy.

FIELD OF THE INVENTION

The invention relates generally to the detection of solar events and to an early warning system for detection of a solar event.

BACKGROUND

Solar flares are periods of increased solar activity, and are associated with geomagnetic storms, solar radiation storms, and radio blackouts that are experienced here on Earth. Neutrinos are sub-atomic particles that are generated by the Sun, and it has been speculated that the increased activity associated with solar flares can produce a short-term change in the neutrino flux detected on Earth. Detecting flare neutrinos may lead to a deeper insight into the mechanisms underlying flares, and may have practical consequences.

To date, there appears to be little if any compelling experimental evidence of an association between neutrino flux and solar flares, and this is due in part to the relatively low neutrino counting rates available from even the largest conventional detectors. The first observation and measurement of solar neutrino flux used a chlorine detector in the Homestake Gold Mine in South Dakota. The detector was a single tank containing 615 tons of tetrachloroethylene. The GALLEX detector is located at the Gran Sasso Underground Laboratories in Italy. The GALLEX detector senses solar neutrinos using a 100 ton gallium chloride target solution. A 50 kton imaging water Cerenkov detector, known as the Super Kamioka Nucleon Decay Experiment detector, has been used in Japan.

SUMMARY OF THE INVENTION

The invention features, in one embodiment, a radioactive sample having a decay rate capable of changing in response to interaction with a particle or a field, e.g., emitted by the Sun. A second particle or radiation formed by decay of the radioactive sample can be detected, and the rate of decay of the radioactive sample can be correlated to flux of the first particle or the field. Detection of the first particle or the field can provide an early warning for an impending solar event.

In one aspect, there is a flux detection apparatus including a radioactive sample having a decay rate capable of changing in response to interaction with at least one of a first particle or a field, a detector associated with the radioactive sample, and a processor associated with the detector. The detector is responsive to at least one of a second particle or radiation formed by decay of the radioactive sample. The processor correlates rate of decay of the radioactive sample to flux of the first particle or the field.

In another aspect, there is a method including determining a change in a decay rate of a radioactive sample that interacts with at least one of a particle or a field, and correlating the decay rate of the radioactive sample with the flux of the particle or the field. A specified change in the flux indicates a solar event. In certain embodiments, a second particle or radiation formed by decay of the radioactive sample is detected to determine the change in the decay rate of the radioactive sample.

In yet another aspect, there is an early warning system for detection of a solar event. The system includes a radioactive sample having a decay rate that changes in response to interaction with at least one of a first particle or a field, a detector associated with the radioactive sample, and a processor associated with the detector. The detector is responsive to at least one of a second particle or radiation generated by decay of the radioactive sample. The processor correlates the decay rate of the radioactive sample to the flux of the first particle or the field. An indicator signifies an impending solar event in response to a specified change in the flux.

In still another aspect, there is a method of notifying a user of an impending solar event. A change in a decay rate of a radioactive sample that interacts with at least one of a particle or a field is determined. The decay rate of the radioactive sample is correlated with the flux of the particle or the field. The user is notified of a specified change in the flux indicative of the impending solar event.

In yet another aspect, there is an early warning system for detection of a solar event. The system includes a memory module storing data indicative of solar events, and a processor associated with the memory module. The processor correlates (i) a decay rate of a radioactive sample to flux of at least one of a first particle or a field received by the radioactive sample and (ii) the data indicative of solar events to determine likelihood of the solar event. An indicator associated with the processor signifies the impending solar event.

In another aspect, there is an apparatus comprising means for determining a change in a decay rate of a radioactive sample that interacts with at least one of the particle or the field, and means for correlating the decay rate of the radioactive sample with the flux of the particle or the field. A specified change in the flux indicates a solar event. The apparatus can include means for notifying a user of a specified change in the flux indicative of the impending solar event.

In other examples, any of the aspects above, or any apparatus or method described herein, can include one or more of the following features.

The first particle can be a neutrino. The second particle can include at least one of an electron, an alpha particle, or a beta particle. The radioactive sample can be a radioactive isotope of manganese. A specified change in the flux can be indicative of a solar event.

In certain embodiments, a system or apparatus can include a second radioactive sample having a second decay rate that changes in response to interaction with at least one of the first particle or the field. A second detector is associated with the second radioactive sample. The second detector is responsive to at least one of a third particle or a second radiation generated by decay of the second radioactive sample. The processor can correlate the decay rate of the radioactive sample and the second decay rate of the second radioactive sample to the flux of the first particle or the field.

A memory module can be associated with the processor. The memory module can store data indicative of solar events. The processor can correlate the specified change in the flux and the data indicative of solar events to determine likelihood of the impending solar event.

The indicator can include a communications module adapted for transmitting a signal indicative of the impending solar event to the user. The communications module can be adapted for transmitting a signal indicative of the impending solar event to a remote module capable of being disabled in advance of the impending solar event affecting the remote module.

In certain embodiments, the radioactive sample can be exposed to the particle or the field, and a second particle or radiation formed by decay of the radioactive sample can be detected. The decay rate of the radioactive sample can be correlated with a known decay rate of the radioactive sample to determine the specified change in the flux.

A second change in a second decay rate of a second radioactive sample that interacts with the particle or the field can be determined, and the decay rate of the radioactive sample and the second decay rate of the second radioactive sample can be correlated with the flux of the particle or the field.

A signal indicative of the impending solar event can be transmitted to a user. A signal indicative of the impending solar event can be transmitted to a remote module capable of being disabled in advance of the impending solar event affecting the remote module.

The details of one or more examples are set forth in the accompanying drawings and the description below. Further features, aspects, and advantages of the invention will become apparent from the description, the drawings, and the claims.

BRIEF DESCRIPTION OF THE DRAWINGS

The advantages of the invention described above, together with further advantages, may be better understood by referring to the following description taken in conjunction with the accompanying drawings. The drawings are not necessarily to scale, emphasis instead generally being placed upon illustrating the principles of the invention.

DESCRIPTION OF THE INVENTION

Figure 1:
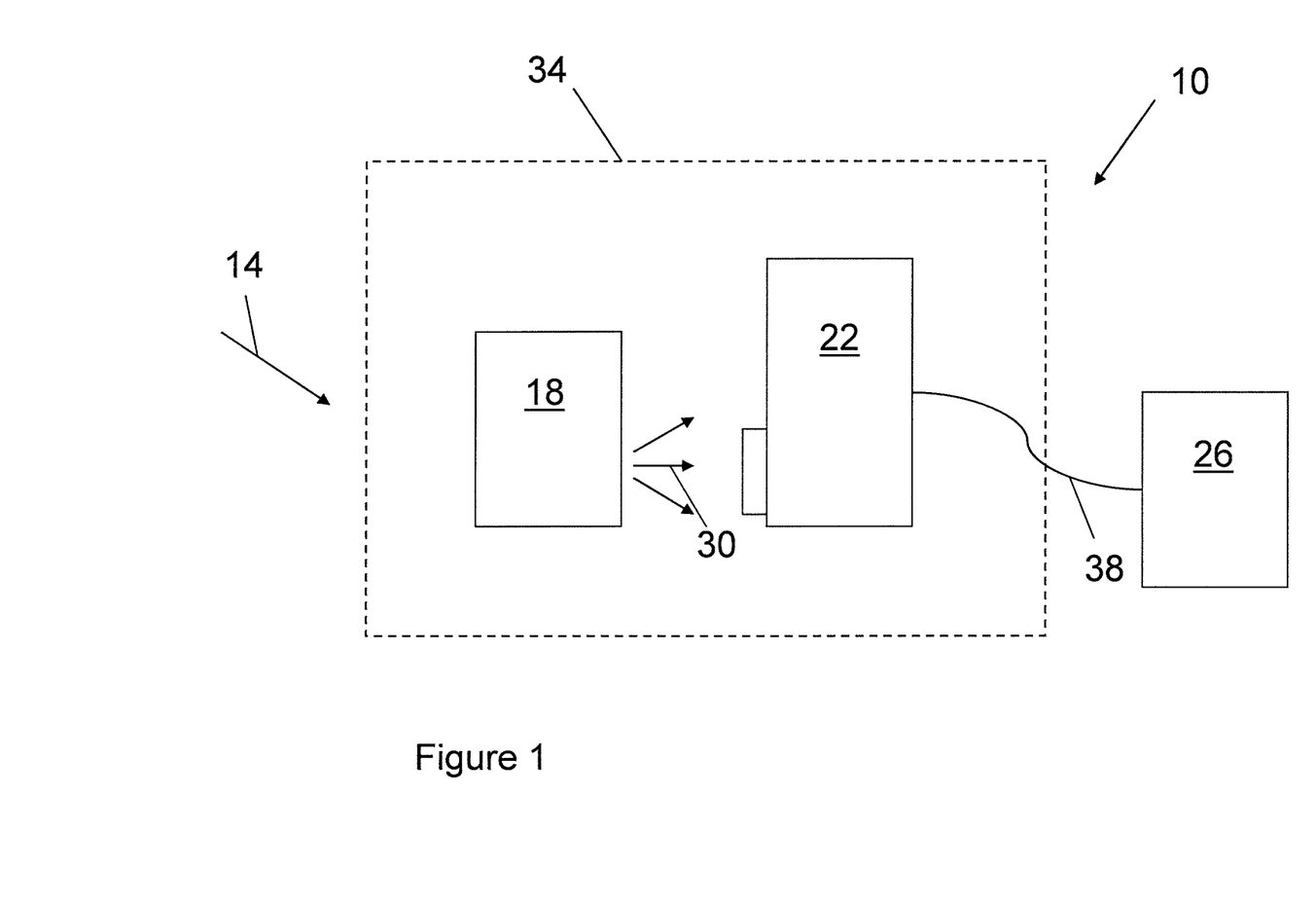
FIG. 1 is a schematic diagram of a system for detecting a particle or field emitted, e.g., from the Sun.

FIG. 1 shows a system 10 for detecting flux of a particle and/or field 14. The system 10 includes a radioactive sample 18, a detector 22, and a processor 26. The radioactive sample 18 has a decay rate capable of changing in response to interaction with the first particle and/or the field 14. The detector 22 is associated with the radioactive sample 18, and is responsive to at least one of a second particle or radiation 30 formed by decay of the radioactive sample 18. The processor 26 is associated with the detector 18, and correlates rate of decay of the radioactive sample 18 to flux of the first particle and/or the field 14. A specified change in the flux can indicate a solar event (e.g., a storm, flare, or other activity).

The system 10 can include a housing 34, which can enclose one or more of the radioactive sample 18 and the detector 22. The processor 26 can be enclosed in the housing 34, can be outside the housing 34 and in communication with the processor 26 via connection 38, or can be fixed to an outer surface of the housing 34.

The particle and/or field 14 can be emitted from the Sun. In certain embodiments, the particle is a neutrino or other particle emitted by the Sun. In some embodiments, the field can be an electric field, magnetic field, an electromagnetic field, or a gravitation field of the Sun. The second particle can be an electron, an alpha particle, or a beta particle emitted by the radioactive sample. Radiation can be one or more photons, e.g., of electromagnetic radiation. The radioactive sample can include a radioactive isotope, e.g., manganese, radium, silicon, fluorine, chlorine, titanium, cesium or other suitable radioactive material.

The processor 26 can be a computer processor, a computer device, or any component of a computer (e.g., a module or a card). Furthermore, the processor 26 can carry out a computerized method and/or operate using a computer program product, tangibly embodied in an information carrier, for verifying document compliance to a standard. The computer program product can include instructions being operable to cause data processing.

Figure 2:
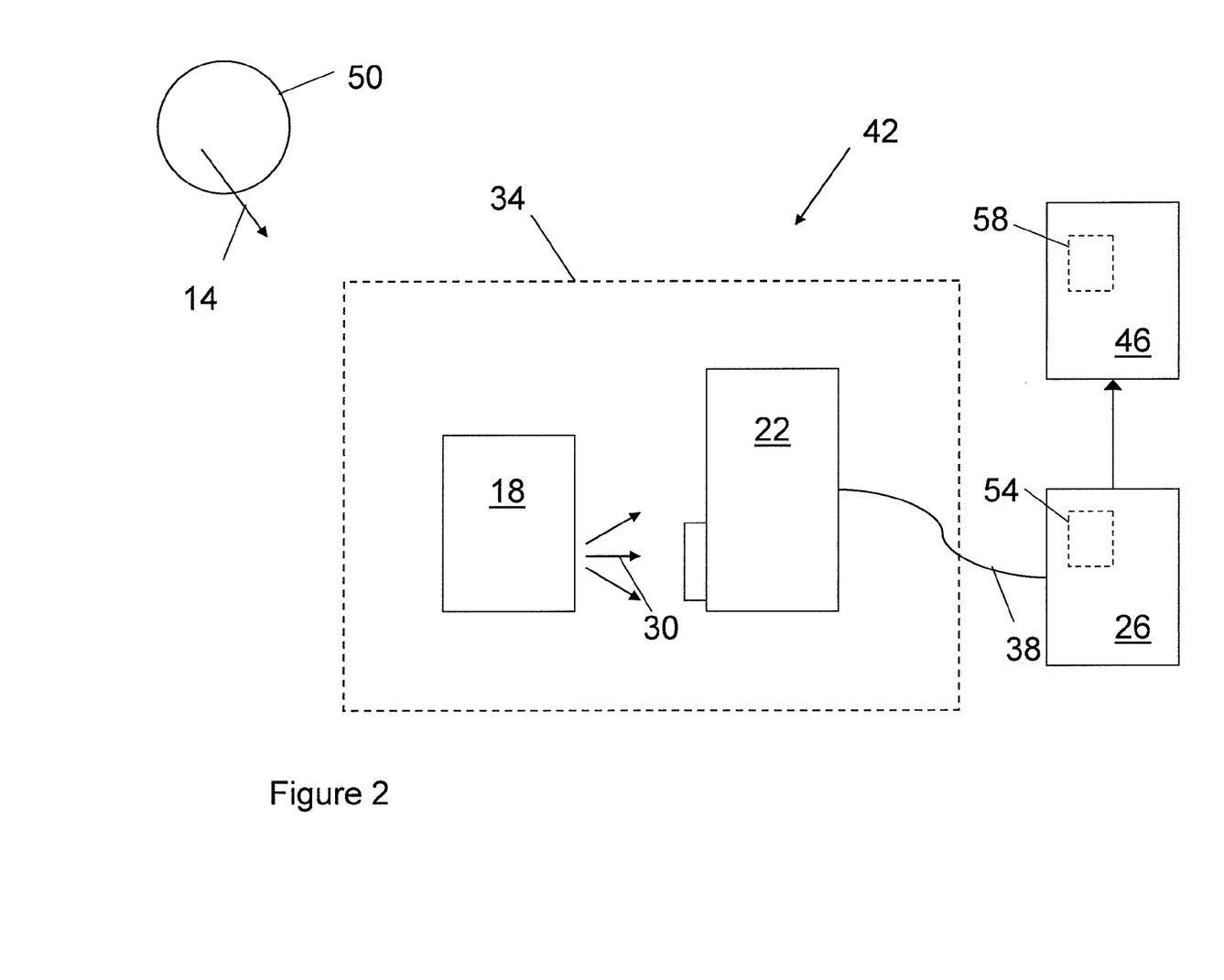
FIG. 2 is a schematic diagram of a system for detecting a particle or field emitted, e.g., from the Sun.

FIG. 2 shows an early warning system 42 for detection of a solar event. The system 42 includes radioactive sample 18, detector 22, and processor 26. An indicator 46 signifies an impending solar event in response to a specified change in the flux. Particle or field 14 can be emitted by the Sun 50.

Processor 26 can include a memory module 54 that can store data indicative of solar events. The processor 26 can correlate the specified change in the flux and the data indicative of solar events to determine likelihood of the impending solar event.

The indicator 46 can include a communications module 58 adapted for transmitting a signal indicative of the impending solar event to a user. The communications module 58 can be adapted for transmitting a signal indicative of the impending solar event to a remote module, which can be disabled in advance of the impending solar event.

Figure 3:
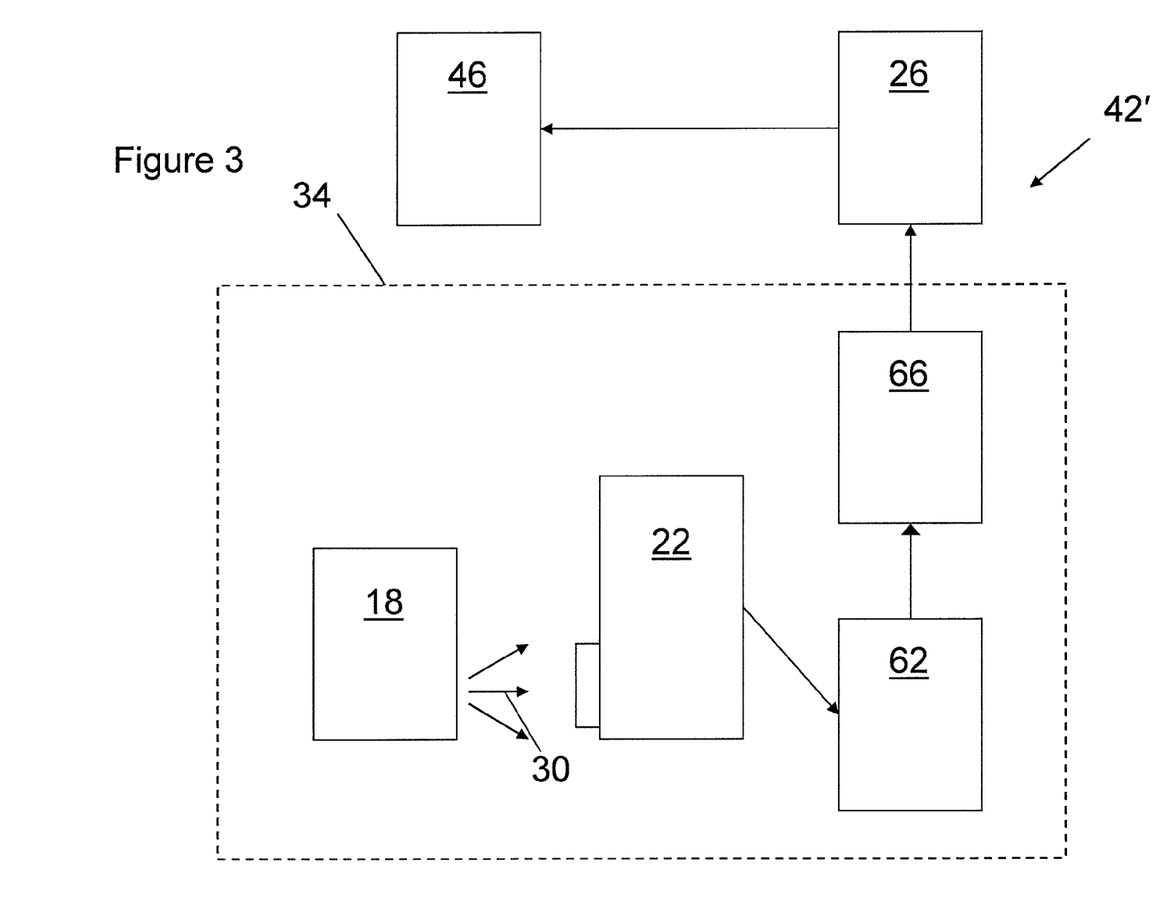
FIG. 3 is a schematic diagram of an early warning system for alerting a user to a solar event.

FIG. 3 shows an early warning system 42' including radioactive sample 18, detector 22, processor 26, and indicator 46. The early warning system 42' can include a pre-amplifier 62 and an amplifier 66, which can amplify the signal being analyzed by the processor 26.

Figure 4:
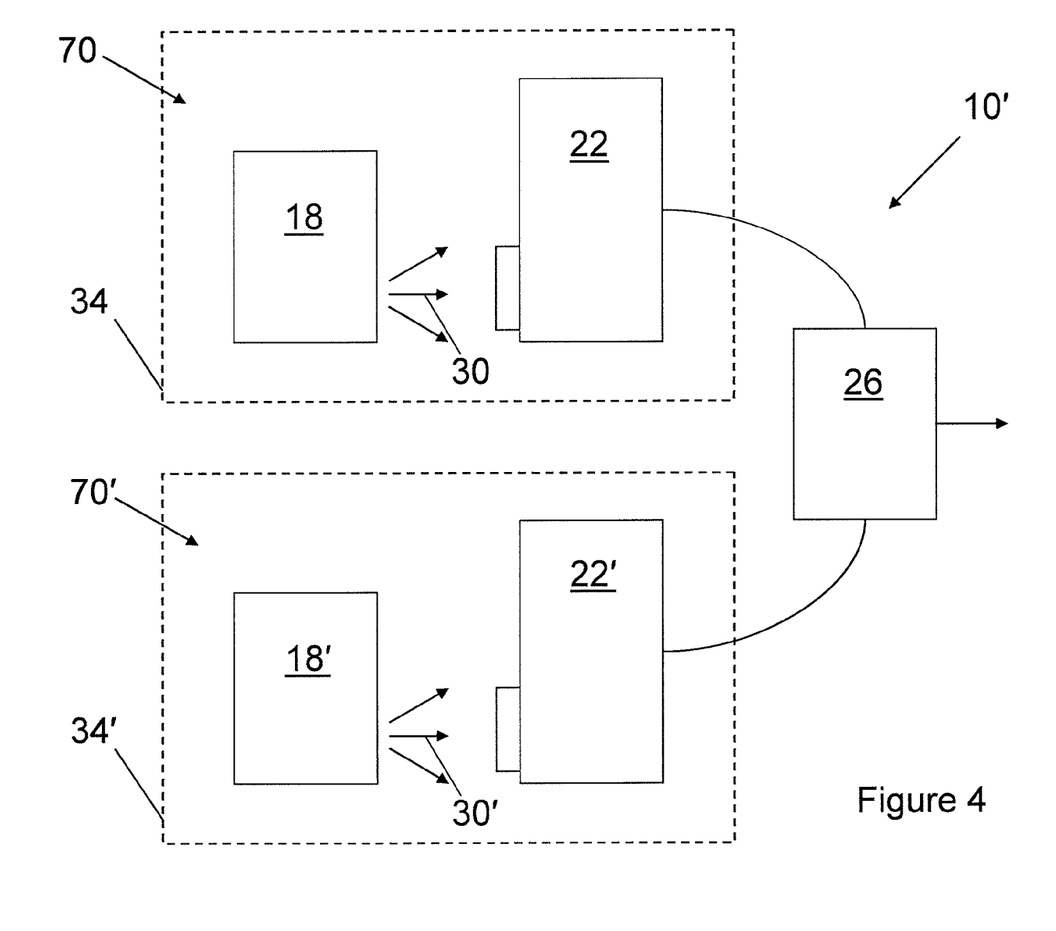
FIG. 4 is a schematic diagram of a system for detecting a particle or field emitted, e.g., from the Sun.

FIG. 4 shows a system 10' for detecting flux of at least one of a particle or field 14 emitted, e.g., by the Sun. The system 10' includes a first detection system 70 and a second detection system 70'. The first detection system 70 includes radioactive sample 18 and detector 22. The second detection system 70' includes radioactive sample 18' and detector 22'. Signals from detector 22 and detector 22' are analyzed by processor 26.

By using two or more detection systems, a radioactive sample can be selected that can better match the energy spectrum of the particle or field. For example, certain isotopes can be matched to the energy spectrum of neutrinos being emitted by the Sun. Furthermore, different radioactive samples can provide different sensitivities over different timescales, so that a radioactive sample can be matched to the anticipated or observed particle or field emitted by the Sun. Therefore, processor 26 can weight a signal from the first radioactive sample 18 differently than a signal from the second radioactive sample 18' during signal analysis.

Figure 5:
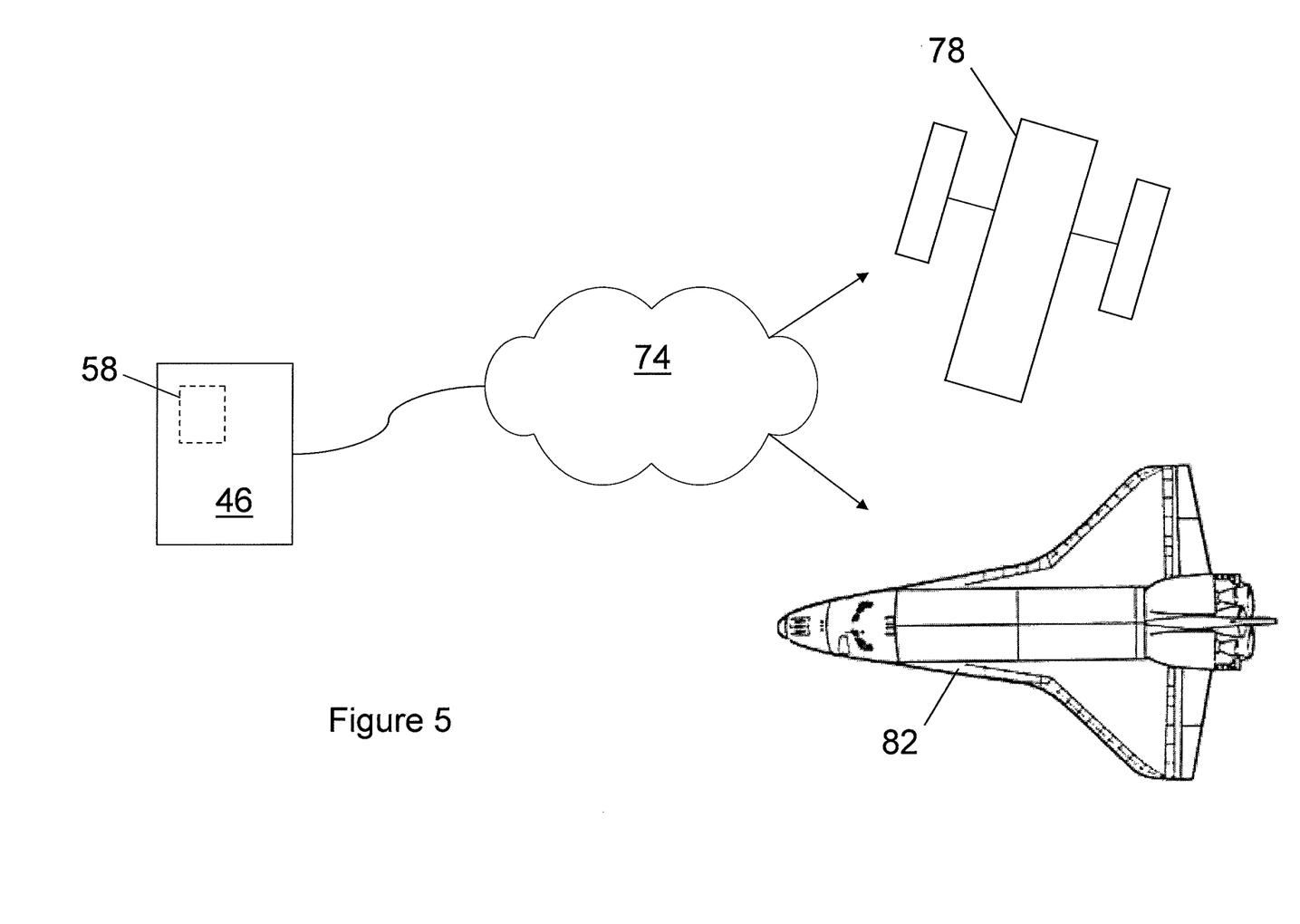
FIG. 5 is a schematic diagram of an early warning system for alerting a remote module to a solar event.

FIG. 5 shows indicator 46 in communication with a remote module via a network 74. The remote module can be, e.g., satellite 78 or spacecraft 82. The indicator 46 can communicate with the remote module via communications module 58. The remote module can be disabled, shielded, or otherwise protected in advance of an impending solar event having potentially harmful effects for the remote module or its occupants.

Observations made during the solar eclipses of 14 Oct. 2004, 8 Apr. 2005, and 22 Sep. 2006 suggest that solar activity influences nuclear decay. For example, the timing of spikes in the decay rate of $^{137}$Cs and other nuclides suggests that these spikes can result from changes in detected solar activity, rather than as a result of local systematic effects. Analysis of timing data further suggests that at least part of the observed fluctuations in decay rates can be due to the fluctuation in the flux of solar neutrinos reaching a decaying sample. Data obtained during the solar flare of 13 Dec. 2006 (the x-rays of which were first recorded at 21:37 EST on 12 December) can be used to support the conclusion that the decaying samples responded to changes in the flux of solar neutrinos. In addition, a general class of neutrino interactions can account for both the observed solar flare data.

The radioactive sample 18 can be attached to a front surface of the detector 22. The radioactive sample 18 can be a 1 µCi sample of $^{54}$Mn; the detector 22 can be a Bicron 2×2 inch NaI(Tl) crystal detector (e.g., model number 2M2/2-X). The pre-amplifier 62 can include a photomultiplier (PMT) (e.g., an Ortec PMT base). The amplifier 66 can be a spectroscopy amplifier (e.g., an Ortec 276), which can be used to analyze the preamplifier signal. Software associated with processor 26 can be used for collecting and analyzing data. For example, an Ortec Trump PC1 card can run Ortec's Maestro32 MCA software.

In certain embodiments, the radioactive sample 18 can include a gas filled radiation detector, a solid state radiation detector, a plastic radiation scintillation detector, or a Geiger counter.

The system can be used to record the 834.8 keV γ-ray emitted from the de-excitation of $^{54}$Cr produced from the K-capture process $^{54}$Mn+e→$^{54}$Cr+$v_e$. The radioactive sample 18 and the detector 22 can be shielded on all sides by lead bricks, except at the end of the PMT base where a space can be left to accommodate any communication cables. For example, the lead bricks can comprise or be a component of housing 38.

The decay rate of $^{54}$Mn can be compared to a baseline of data to determine if a change in the decay rate has resulted. The baseline can be established by comparison to a known source of neutrinos (e.g., a shielded 44 Ci$^{137}$Cs source) or by measurement of a naturally occurring source. Observation of a difference in the decay rate versus the known source, or a spike in decay rate versus a natural source, can result from neutrinos influencing the nuclear decay rates of the $^{54}$Mn sample. For example, a decrease in the decay of $^{54}$Mn (as measured by a decrease in the photon count rate) can signal an impending solar event. The decrease in the decay of $^{54}$Mn can achieve a predetermined, selected, or specified to indicate the solar event. In certain embodiments, an increase in the decay of a radioactive sample can signal an impending solar event. In certain embodiments, an increase in the production of the second particle or radiation can signal an impending solar event (e.g., electrons produced by a radioactive sample of silicon).

Figure 6:
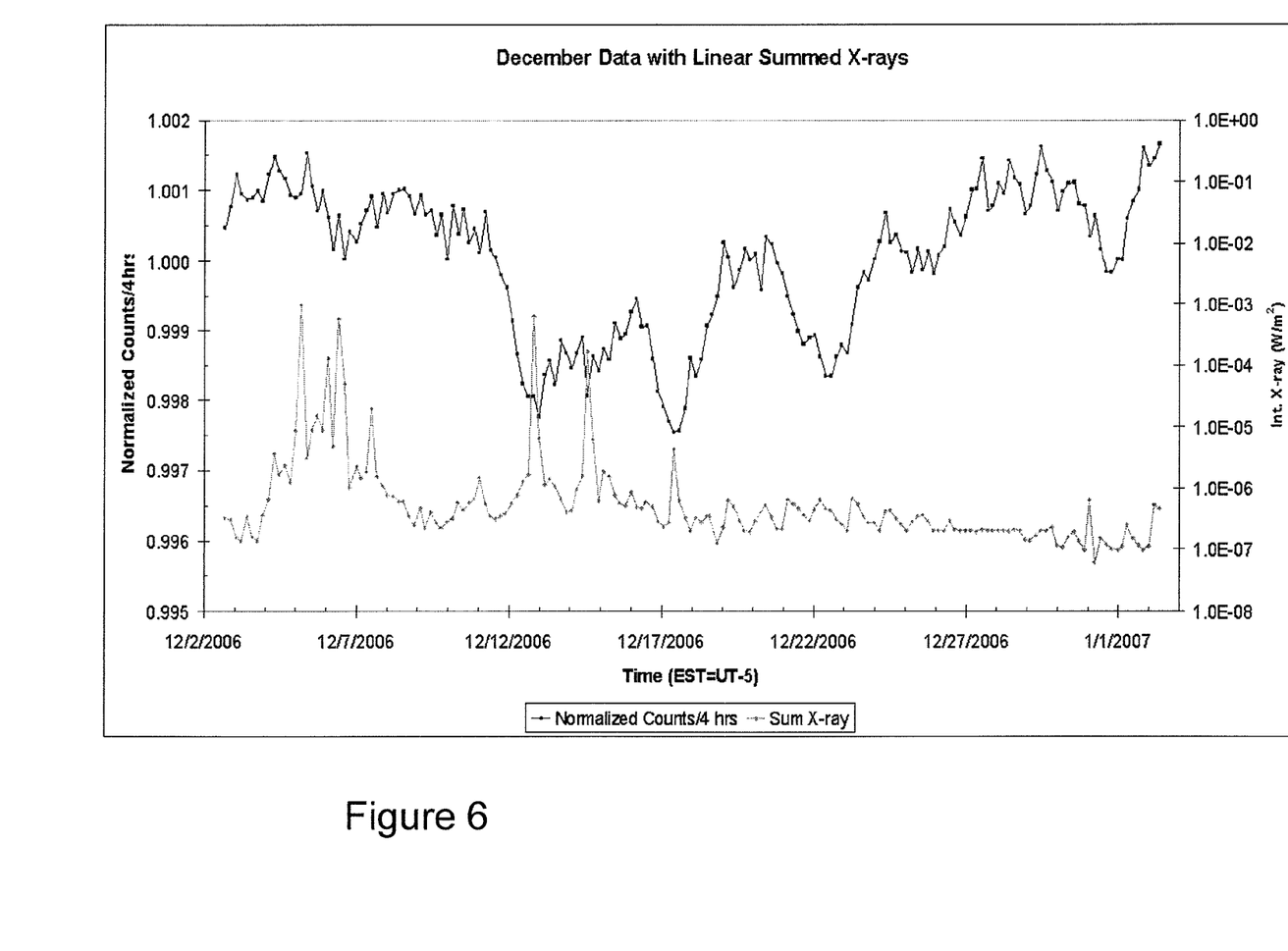
FIGS. 6-8 are graphs showing x-ray data from an X3 class solar flare and the normalized $^{54}$Mn counting rates.
Figure 7:
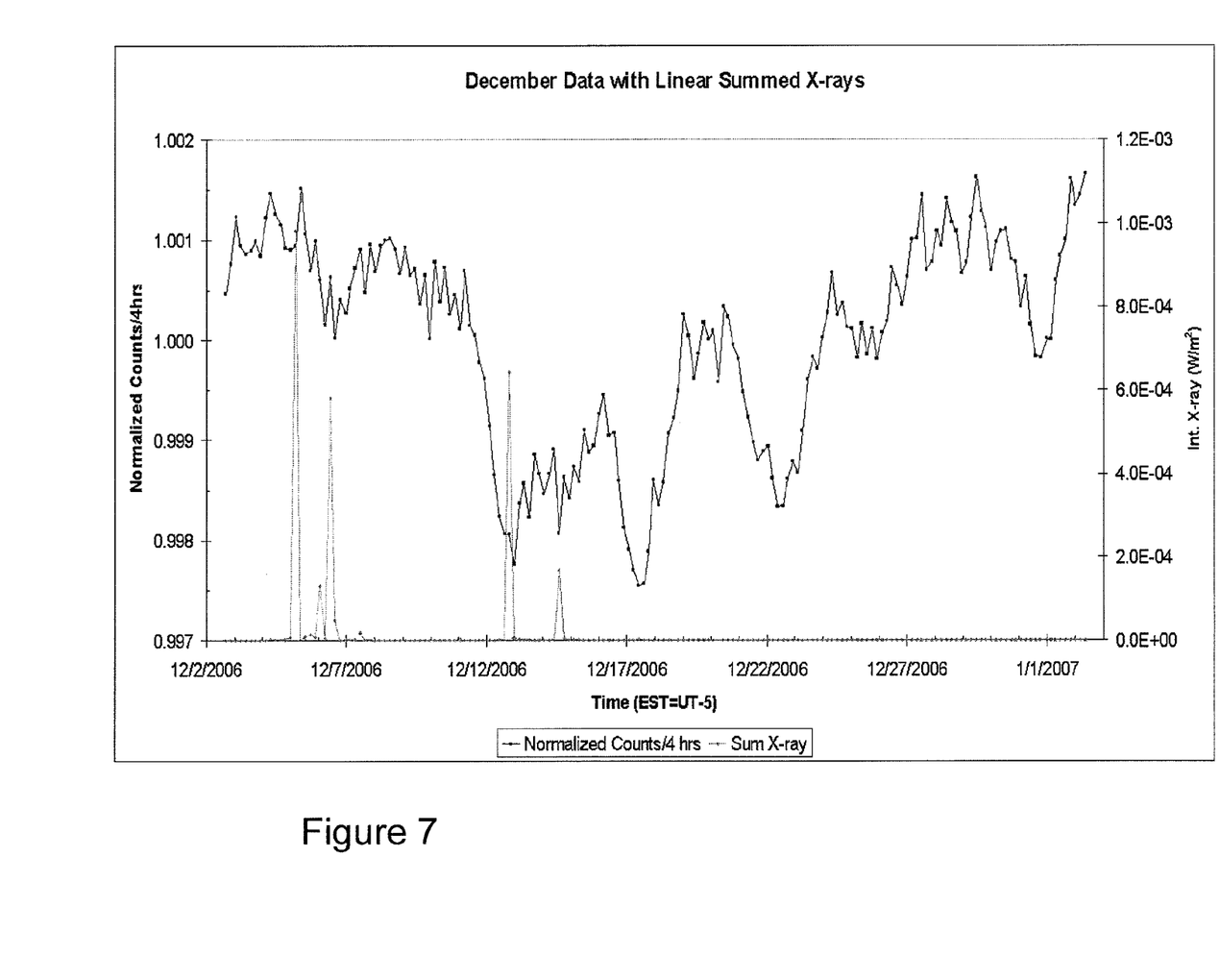
Figure 8:
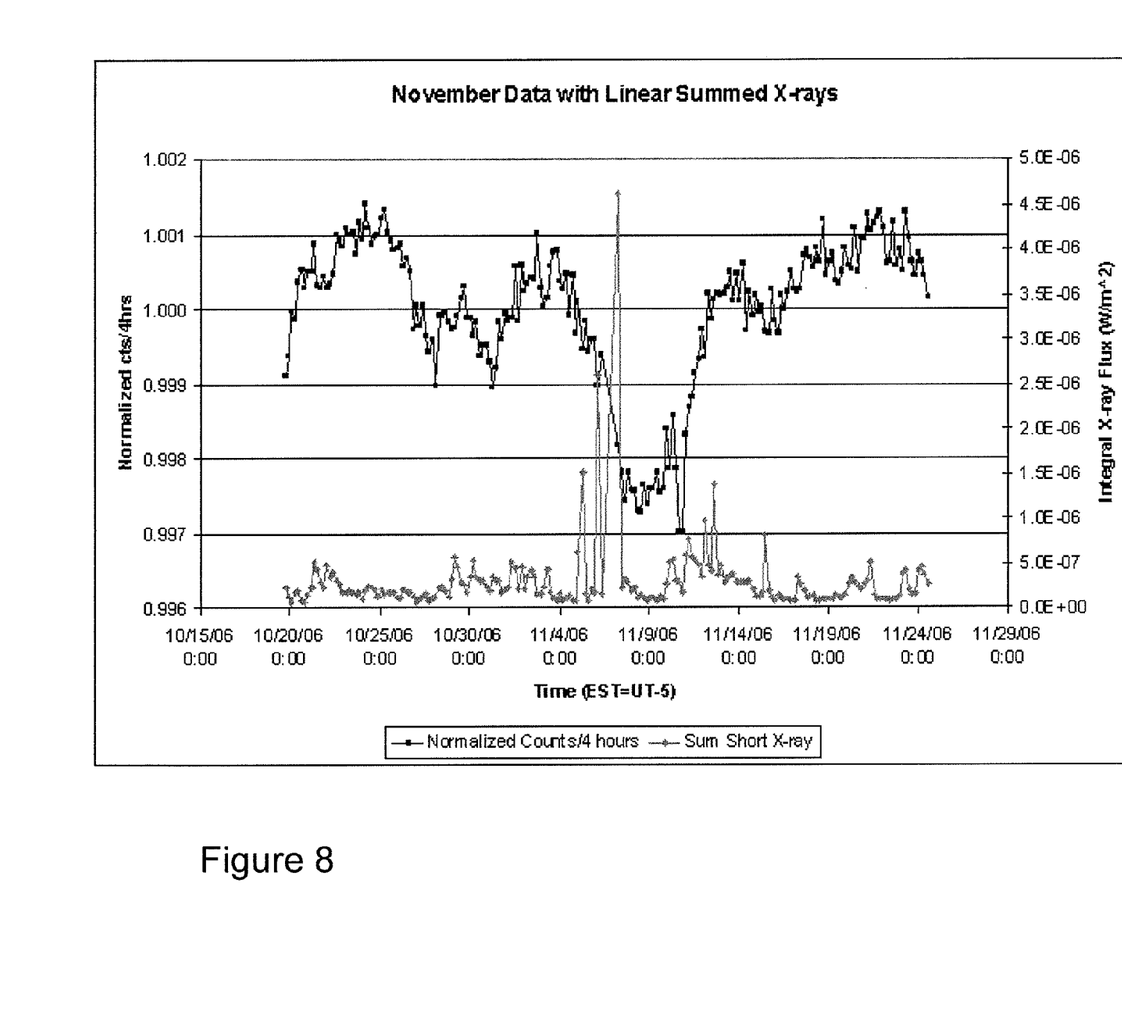

On 13 Dec. 2006, a solar flare was detected by the Geostationary Operational Environmental Satellites (GOES-10 and GOES-11). Spikes in the x-ray and proton fluxes were recorded by GOES satellites. FIGS. 6-8 show x-ray data from X3 class solar flares and the normalized $^{54}$Mn counting rates. In each 4 hour live-time period (about 4.25 hours real-time), about 2.5×10$^7$ 834.8 keV γ-rays with a fractional 1/√N statistical uncertainty of about 2×10$^{-4}$ were recorded. Each data point in FIGS. 6-8 represents the number of counts in the subsequent 4 hour period, normalized by the number of counts N(t) expected from a monotonic exponential decay, N(t)=N$_0$e$^{-\lambda t}$, with $\lambda \cong 0.00235 d^{-1}$. For the x-ray data, each point is the solar flux in W/m$^2$ summed over the same 4.25 hour period.

FIGS. 6-8 show that, to within the time resolution offered by the 4 hour width of the bins, the $^{54}$Mn counting rates exhibit a decrease (a negative spike or trough), which is coincident in time with the spike in the x-ray flux that signaled the onset of the solar flare. Although a second x-ray peak on 13 December at 07:15 EST corresponds to a relatively small trough in the $^{54}$Mn counting rate, a third peak on 17 December at 02:40 EST is again accompanied by an obvious trough in the $^{54}$Mn counting rate.

Some x-ray spikes in these data sets are not accompanied by correspondingly prominent troughs in the $^{54}$Mn counting rate data, which can be correlated to the underlying mechanisms that produce these spikes. Conversely, peaks or troughs in the $^{54}$Mn counting rate data not accompanied by visible x-ray spikes (such as the trough on 22 December [09:04 EST]) may correspond to flares or other solar events on the opposite side of the Sun which are being detected via neutrinos. Additionally, the angular dependence of previous correlations can play a significant role in the solar flares as well.

Solar flares produce a variety of electromagnetic effects on Earth, including changes in the Earth's magnetic field and power surges in electric grids. The observed dips in the $^{54}$Mn counting rate can arise from the response of a detection system to other sources, such as the solar flare, rather than the $^{54}$Mn atoms themselves. However, the observed dip in the $^{54}$Mn counting rate coincident with the solar flare at 21:37 EST on 12 Dec. 2006 is not likely the result of a conventional electromagnetic or other systematic effect.

Coincident fluctuations in the decay data and the solar flare data can arise from statistical fluctuations in each data set. In FIG. 7, there is a dip region in the decay data in an 84 hour period extending between 11 Dec. 2006 (17:52 EST) and 15 Dec. 2006 (06:59 EST). The measured number of decays N$_m$ in this region can then be compared to the number of events N$_e$ expected in the absence of the observed fluctuations, assuming a monotonic exponential decrease in the counting rate. Since the systematic errors in N$_e$ and N$_m$ are small compared to the statistical uncertainties in each, only the latter are retained and, $$N_e - N_m = (7.51 \pm 1.07) \times 10^5,$$

where the dominant contributions to the overall uncertainty arise from the √N fluctuations in the counting rates. If the equation above is interpreted as a ~7σ effect, then the formal probability of such a statistical fluctuation in this 84 hour period is ~3×10$^{-12}$. Including additional small systematic corrections does not alter the conclusion that the observed fluctuation in the 84 hour window is not a purely statistical effect.

The frequency of solar radiation storms varies with their intensities, which are rated on a scale from S1(Minor) to S5(Extreme). The 13 Dec. 2006 event was rated as an S2 (Moderate), which occurs with an average frequency of 25 per 11 year solar cycle. In total, the frequency of storms with intensity≧S2 is ~39 per 11 year solar cycle, or 9.7×10$^{-3}$, and hence the probability of a storm occurring at any time during the 84 hour window in FIG. 7 is ~$3.4\times10^{-2}$. If the x-ray and decay peaks are uncorrelated, the probability that they coincided over the short time interval of the solar flare is smaller still, and hence a conservative upper bound on such a statistical coincidence occurring in any 84 hour period is ~$1\times10^{-13}$. Since a similar analysis applies to the coincident peak and dip at 12:40 EST on 17 December, the probability that random fluctuations produce two sets of coincidences several days apart is negligibly small.

The $^{54}$Mn decay rate began to decrease more than one day before any signal was detected in x-rays by the GOES satellites. Since other electromagnetic signals can not reach the Earth earlier than the x-rays, conventional electromagnetic effects arising from the solar flare are unlikely sources. The most significant impact on the geomagnetic field occurs with the arrival of the charged particle flux, several hours after the arrival of the x-rays.

A detection system can be affected by fluctuations in line voltages. An alert is triggered if the line voltage strays out of the range 115-126 V. No unusual behavior was detected. Moreover, a power surge shifts the $^{54}$Mn peak slightly out of the nominal region of interest (ROI) for the 834.8 keV γ-ray, and can be corrected for in the routine course of our data acquisition. A correction was not required, however, because a significant change to neither the peak shape nor location were noted.

Figure 9:
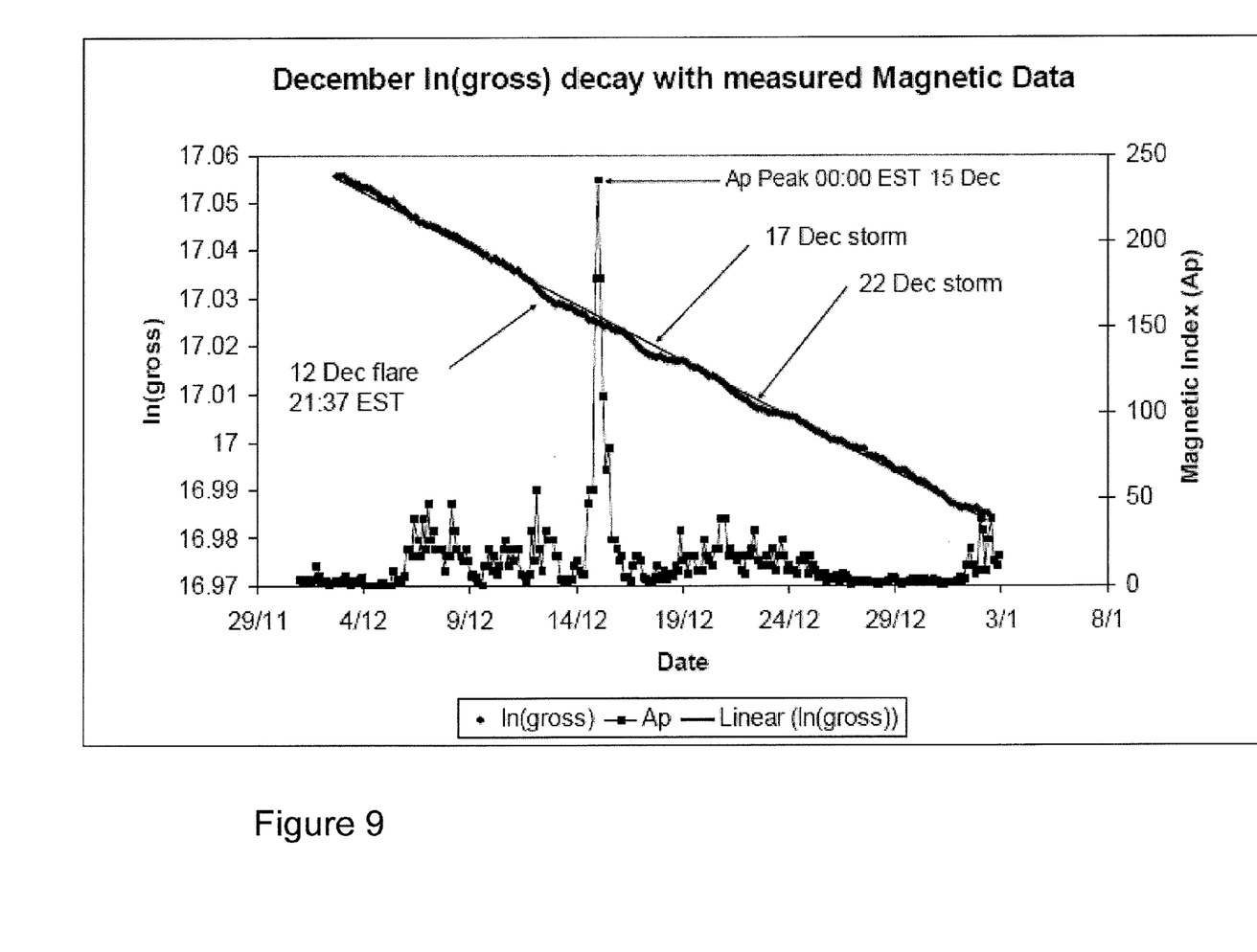
FIG. 9 is a graph showing the effect of fluctuations in the Earth's magnetic field on the detection system.

FIG. 9 shows fluctuations in the Earth's magnetic field on the detection system. FIG. 9 shows the $A_p$ index for the Earth's magnetic field during December 2006, along with the $^{54}$Mn counting rate. The magnetic field fluctuations, which are characterized by the $A_p$ index, are plotted along with the natural logarithm of the $^{54}$Mn counting rate. The sharp spike in the $A_p$ index at approximately 00:00 EST on 15 Dec. 2006 occurred more than two days after the solar flare and the accompanying dip in the $^{54}$Mn counting rate, and was not the cause of this dip. Therefore, the detection system was insensitive to applied magnetic fields that were more than 100 times stronger than the spike exhibited in FIG. 9, and the counting rate did not depend on the magnitude of the external field.

Therefore, the dips were a response to a change in the flux of a particle or field (e.g, a neutrino) from the Sun during the flare. The x-ray spike occurred at ~21:40 EST, approximately 4 hours after local sunset, which was at ~17:21 EST on 12 Dec. 2006. The particle or field traveled ~9,270 km through the Earth before reaching the $^{54}$Mn source, and produced a decrease in the counting rate coincident in time with the peak of the x-ray burst. The monotonic decline of the counting rate in the 40 hours preceding the dip occurred while the Earth went through 1.7 revolutions, and yet there is no obvious diurnal or other periodic effects. These observations support that the effect arose from a particle or field (e.g., neutrinos or some neutrino-like particle) from the Sun, and not from any conventional or terrestrial known electromagnetic effect or other source, such as known charged particles.

Although both the x-ray and proton spikes can be essentially instantaneous, within the time resolution of the detector, the neutrino flux reached its peak more slowly, having been first detected approximately a day earlier. The detection of such "precursor neutrinos" from a solar flare can be used as an early warning system for energy and telecommunications infrastructure and Global Positioning Systems, as well as for astronauts, in anticipation of future flares. A neutrino signal, which anticipates the arrival of a later x-ray or particle burst, can be referred to as a solar neutrino precursor event (SNUPE).

Although somewhat counterintuitive, neutrinos can be detected by relatively small samples of radioactive nuclides. That is, small samples of radioactive nuclides can serve as real-time neutrino detectors. Several features of nuclear decays facilitate such detection, e.g., the sensitivity of nuclear half-lives to the available decay energy, and hence, by extension, to small shifts in the decay energy. Furthermore, a class of spin-dependent neutrino couplings exists, which can account for the flare data. Radionuclide neutrino detectors can be combined with existing detectors, such as the Super Kamiokande, for making measurements. Furthermore, historical data can be used to identify trends and make predictions.

A SNUPE can represent a neutrino signal or a signal carried by another particle or field that interacts relatively weakly with the constituents of the solar interior or the Earth. Furthermore, the fact that a locally detectable signal precedes x-ray or radio bursts has practical consequences. For example, the arrival of a neutrino signal prior to an x-ray or proton burst can be understood in terms of the different opacity of the Sun for neutrinos compared to x-rays or charged particles.

The ability to detect a SNUPE in real time has immediate practical consequences. A single detector or a worldwide array of detectors using a radioactive sample (e.g., $^{54}$Mn) can provide electronic systems, telecommunication systems, satellite networks, spacecraft, space stations, aircraft, power systems, or electrical system an early warning of a solar event (e.g., a large impending solar flare), allowing these systems to adopt appropriate protective measures to avoid damage. Furthermore, SNUPE detection systems can be built into future spacecraft, or settlements on the Moon or other planets, to forewarn astronauts of an impending life-endangering solar storm. Given such a warning, astronauts can be sheltered inside appropriately designed shielded spaces, thus sidestepping the need to protect the entire spacecraft or settlement against such storms.

Furthermore, certain industries (e.g., the insurance industry) may require installation of an early warning system or subscription to a service to lower insurance premiums for large, expensive satellites and telecommunications systems that can be damaged by solar events. In certain embodiments, an entity can be insured with respect to an income-producing property including a remote module orbiting, in the atmosphere of, or on the surface of a celestial body, a planet, or moon. A policy can be provided to an entity. The policy can define a default as failing to have an early warning system or to maintain a subscription to a service. The entity can be insured against loss of income or equipment so long as the entity is not in default of the policy.

Another application of the ability to detect neutrinos in real time is to monitor the changing radiation levels being received by patients due to changing decay rates for radioactive atoms. In thyroid cancer, for example, where radioactive iodine is implanted in the thyroid, it is desirable to control the radiation dosage to within 5% or better to ensure that the patient is neither overdosed nor underdosed, e.g., due to changing neutrino flux. Because the technology allows real time monitoring, medical personnel can modify a treatment protocol appropriately, in response to a change in neutrino flux.

Figure 10:
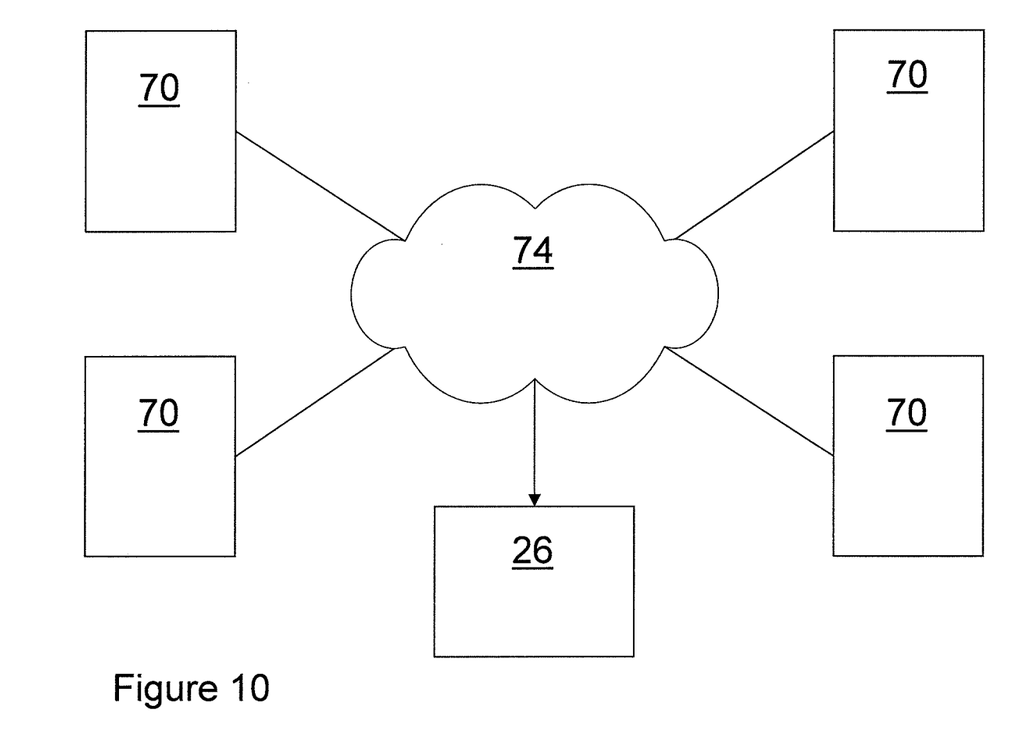
FIG. 10 is a schematic diagram of an array of detection systems.

FIG. 10 shows an array of detection systems 70 in communications with a processor 26 via a network 74. The array of detection systems 70 can be placed at various points on the Earth, or some detection systems 70 can be positioned terrestrial while others are placed outside the Earth's atmosphere. Each detection system 70 can be associated with a telecommunication system, a satellite, a spacecraft, a space station, an aircraft, a power system, or other electrical and electronic system. The processor 26 can be located at a college, university, or commercial facility. Each detection system 70 can measure a change in flux, and the processor 26 can correlate the signals to determine the likelihood of a solar event.

The network 74 can include processor 26 (e.g., a client computing device 305) that includes a module for signal processing, e.g., as described above. The processor 26 can communicate with one or more servers to transmit and receive information needed by or generated by the processor 26. A server can communicate with a database server that manages a database (e.g., including historical data regarding solar activity). In the network 74, a database can be part of an enterprise network and the communication network can be a private company network, for example, an intranet. A server can also communicate with devices outside of the internal network, using a communication network. A server can communicate with the network 74 through a firewall. In the network 74, an external database server, which manages a database, can be an external device with which the computing device, via the server, can communicate.

In operation, in one embodiment, the processor 26 downloads from a database (or an external database) information associated with a solar event. If downloading from an external database, the processor 26 can download the information using the communication network 74. The processor 26 can retrieve information from a detection device via a database. The processor 26 can determine the likelihood of a solar event.

In one embodiment, the processor 26 tests for the likelihood of a solar event by analysis of an electrical signal from a detection system. If a change is observed, e.g., outside a predetermined or predefined, or specified level, then a solar event is reported, indicated, or signified. In one embodiment, the processor 26 tests for the likelihood of a solar event by analysis of the counting rate of photons. If a dip, decrease or trough is observed, then a solar event is reported. In one embodiment, the processor 26 tests for the likelihood of a solar event by analysis of the emission of a particle (e.g., an electron, alpha particle, or beta particle). If an increase is observed, then a solar event is reported.

An early warning system can provide real-time detection of a particle or field emitted by the Sun to predict or indicate an impending solar event, and need not rely on analysis of a historical record to understand what has previously occurred. The system can identify complex patterns in solar data, which can include real-time measurements, historical measurements, and/or predicted or simulated data from models. Appropriate weights can be applied to the various data types based on a user's input. A user can assign weights, or a computer program can assign weights based on user input. For example, real-time measurements can receive greater weight than historical measurements or modeled data, and/or one radioactive sample may receive greater weight than a second radioactive sample, e.g., based on sensitivity of the sample, location of the sample, or the like.

Data patterns (both non-event and event-related) can be identified. Cyclic variations in solar (e.g. solar max/min), interplanetary, or geophysical activity can be taken into account. Furthermore, a prediction or indication of a solar event can be customized for particular users or remote modules, and can be updated as new data is measured or derived.

The above-described techniques and/or processes can be implemented in digital electronic circuitry, or in computer hardware, firmware, software, or in combinations of them. The implementation can be as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps can be performed by one or more programmable processors executing a computer program to perform functions of the invention by operating on input data and generating output. Method steps can also be performed by, and apparatus can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Data transmission and instructions can also occur over a communications network. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in special purpose logic circuitry.

The terms "module" and "function," as used herein, mean, but are not limited to, a software or hardware component which performs certain tasks. A module may advantageously be configured to reside on addressable storage medium and configured to execute on one or more processors. A module may be fully or partially implemented with a general purpose integrated circuit (IC), FPGA or ASIC. Thus, a module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and modules may be combined into fewer components and modules or further separated into additional components and modules. Additionally, the components and modules may advantageously be implemented on many different platforms, including computers, computer servers, data communications infrastructure equipment such as application-enabled switches or routers, or telecommunications infrastructure equipment, such as public or private telephone switches or private branch exchanges (PBX). In any of these cases, implementation may be achieved either by writing applications that are native to the chosen platform, or by interfacing the platform to one or more external application engines.

To provide for interaction with a user, the above described techniques can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer (e.g., interact with a user interface element). Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The above described techniques can be implemented in a distributed computing system that includes a back-end component, e.g., as a data server, and/or a middleware component, e.g., an application server, and/or a front-end component, e.g., a client computer having a graphical user interface and/or a Web browser through which a user can interact with an example implementation, or any combination of such back-end, middleware, or front-end components. The components of the system can be interconnected by any form or medium of digital data communication, e.g., a communication network. Examples of communication networks include a local area network ("LAN") and a wide area network ("WAN"), e.g., the Internet, and include both wired and wireless networks. Communication networks can also all or a portion of the PSTN, for example, a portion owned by a specific carrier.

The computing system can include clients and servers. A client and server are generally remote from each other and typically interact through a communication network. The relationship of client and server arises by virtue of computer programs running on the respective computers and having a client-server relationship to each other.

While the invention has been particularly shown and described with reference to specific illustrative embodiments, it should be understood that various changes in form and detail may be made without departing from the spirit and scope of the invention as defined by the appended claims or otherwise described herein.

What is claimed:

1. A flux detection apparatus comprising:
    a radioactive sample having a decay rate capable of changing in response to interaction with at least one of a first particle or a field;
    a detector associated with the radioactive sample, the detector responsive to at least one of a second particle or radiation formed by decay of the radioactive sample; and
    a processor associated with the detector, the processor (i) correlating rate of decay of the radioactive sample to flux of the first particle or the field and (ii) identifying a specified change in the flux indicative of an impending solar flare.

2. The apparatus of claim 1 wherein the first particle is a neutrino.

3. The apparatus of claim 2 wherein the detector is responsive to at least one gamma ray emitted from de-excitation of $^{54}$Cr produced from K-capture process $^{54}$Mn+e→$^{54}$Cr+v.

4. The apparatus of claim 1 wherein the second particle comprises at least one of an electron, an alpha particle, or a beta particle.

5. The apparatus of claim 1 wherein the radioactive sample is a radioactive isotope of manganese.

6. A method comprising:
    determining, by a flux detection device, a change in a decay rate of a radioactive sample that interacts with at least one of a particle or a field;
    correlating, by the flux detection device, the decay rate of the radioactive sample with the flux of the particle or the field; and
    identifying, by the flux detection device, a specified change in the flux indicative of an impending solar flare.

7. The method of claim 6 further comprising detecting, by the flux detection device, a second particle or radiation formed by decay of the radioactive sample to determine the change in the decay rate of the radioactive sample.

8. The method of claim 7 wherein the second particle comprises at least one of an electron, an alpha particle, or a beta particle.

9. The method of claim 6 wherein the particle is a neutrino.

10. The method of claim 6 wherein the radioactive sample is a radioactive isotope of manganese.

11. The method of claim 6 further comprising the step of:
    notifying, by the flux detection device, the user of a specified change in the flux indicative of the impending solar event.

12. The method of claim 11 further comprising:
    exposing the radioactive sample to the particle or the field; and
    detecting, by the flux detection device, a second particle or radiation formed by decay of the radioactive sample.

13. The method of claim 11 further comprising correlating, by the flux detection device, the decay rate of the radioactive sample with a known decay rate of the radioactive sample to determine the specified change in the flux.

14. The method of claim 11 further comprising:
    determining, by the flux detection device, a second change in a second decay rate of a second radioactive sample that interacts with the particle or the field; and
    correlating, by the flux detection device, the decay rate of the radioactive sample and the second decay rate of the second radioactive sample with the flux of the particle or the field.

15. The method of claim 11 further comprising transmitting, by the flux detection device, a signal indicative of the impending solar event to the user.

16. The method of claim 11 further comprising transmitting, by the flux detection device, a signal indicative of the impending solar event to a remote module capable of being disabled in advance of the impending solar event affecting the remote module.

17. The method of claim 6 further comprising detecting, by the flux detection device, at least one gamma ray emitted from de-excitation of $^{54}$Cr produced from K-capture process $^{54}$Mn+e→$^{54}$Cr+v$_e$ to determine the change in the decay rate of the radioactive sample.

18. An early warning system for detection of an impending solar event, comprising:
    a radioactive sample having a decay rate that changes in response to interaction with at least one of a first particle or a field;
    a detector associated with the radioactive sample, the detector responsive to at least one of a second particle or radiation generated by decay of the radioactive sample;
    a processor associated with the detector, the processor (i) correlating the decay rate of the radioactive sample to the flux of the first particle or the field and (ii) forming a prediction for the impending solar event based on a specified change in the flux; and
    an indicator to signify the impending solar event based on the prediction.

19. The system of claim 18 wherein the first particle is a neutrino.

20. The system of claim 18 wherein the second particle comprises at least one of an electron, an alpha particle, or a beta particle.

21. The system of claim 18 wherein the radioactive sample is a radioactive isotope of manganese.

22. The system of claim 18 further comprising:
a second radioactive sample having a second decay rate that changes in response to interaction with at least one of the first particle or the field; and
a second detector associated with the second radioactive sample, the second detector responsive to at least one of a third particle or a second radiation generated by decay of the second radioactive sample;
wherein the processor correlates the decay rate of the radioactive sample and the second decay rate of the second radioactive sample to the flux of the first particle or the field.

23. The system of claim 18 further comprising a memory module associated with the processor, the memory module storing data indicative of solar events, the processor correlating the specified change in the flux and the data indicative of solar events to determine likelihood of the impending solar event.

24. The system of claim 18 wherein the indicator comprises a communications module adapted for transmitting a signal indicative of the impending solar event to the user.

25. The system of claim 24 wherein the communications module is adapted for transmitting a signal indicative of the impending solar event to a remote module capable of being disabled in advance of the impending solar event affecting the remote module.

26. The early warning system for detection of an impending solar event of claim 18, further comprising:
a memory module storing data indicative of solar events;
a processor associated with the memory module, the processor correlating (i) a decay rate of a radioactive sample to flux of at least one of a first particle or a field received by the radioactive sample and (ii) the data indicative of solar events to determine likelihood of the solar event; and
an indicator associated with the processor associated with the memory module to signify the impending solar event.

27. An apparatus comprising:
means for determining a change in a decay rate of a radioactive sample that interacts with at least one of the particle or the field; and
means for correlating the decay rate of the radioactive sample with the flux of the particle or the field, a specified change in the flux indicative of a solar event.

28. The apparatus of claim 27 further comprising means for notifying a user of a specified change in the flux indicative of the impending solar event.

* * * * *